March 15, 1966  K. E. WILSON  3,240,128
FLEXIBLE DIAPHRAGM OPERATED VALVE STRUCTURE
Filed Dec. 18, 1961  2 Sheets-Sheet 1
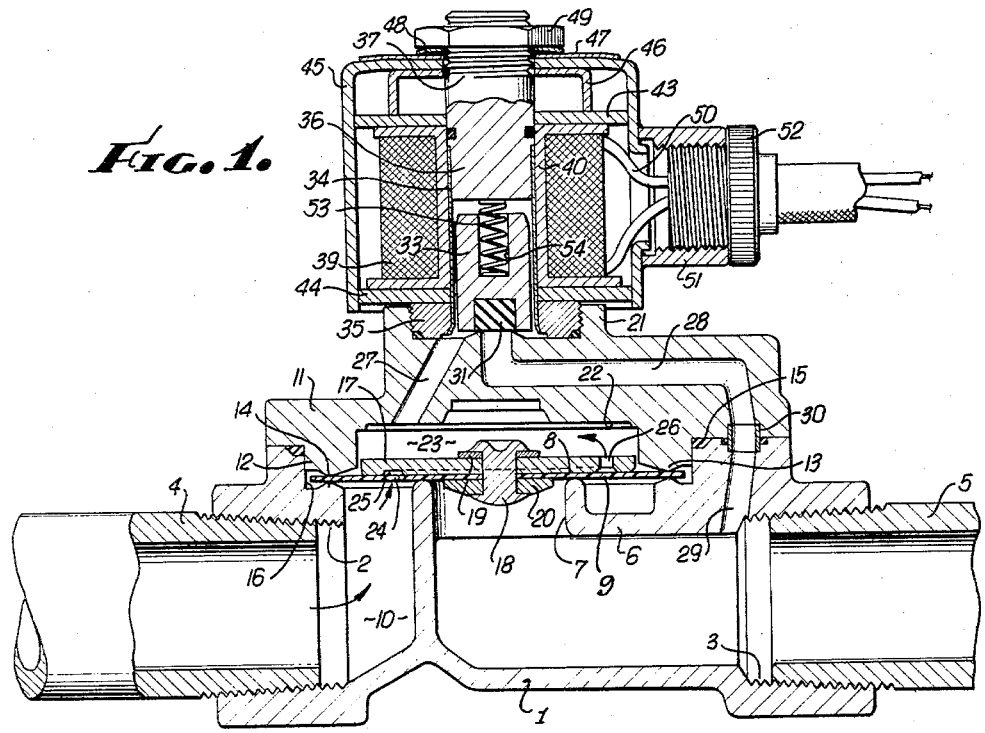
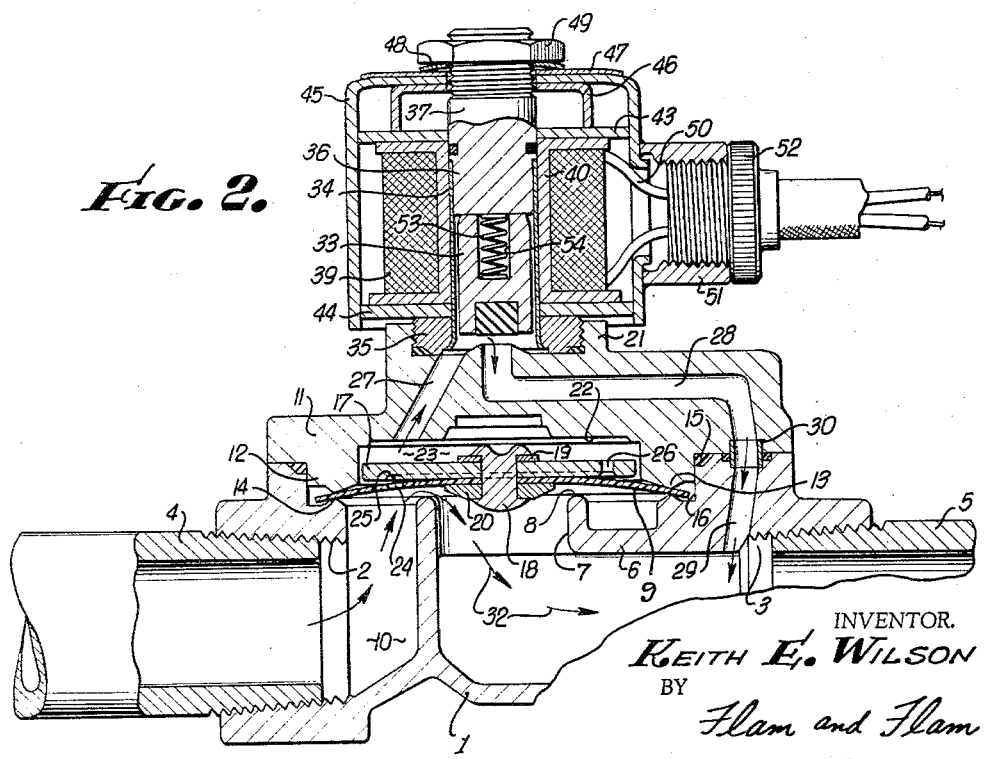
INVENTOR.
KEITH E. WILSON
BY
Flam and Flam
ATTORNEYS.

March 15, 1966  K. E. WILSON  3,240,128
FLEXIBLE DIAPHRAGM OPERATED VALVE STRUCTURE
Filed Dec. 18, 1961  2 Sheets-Sheet 2
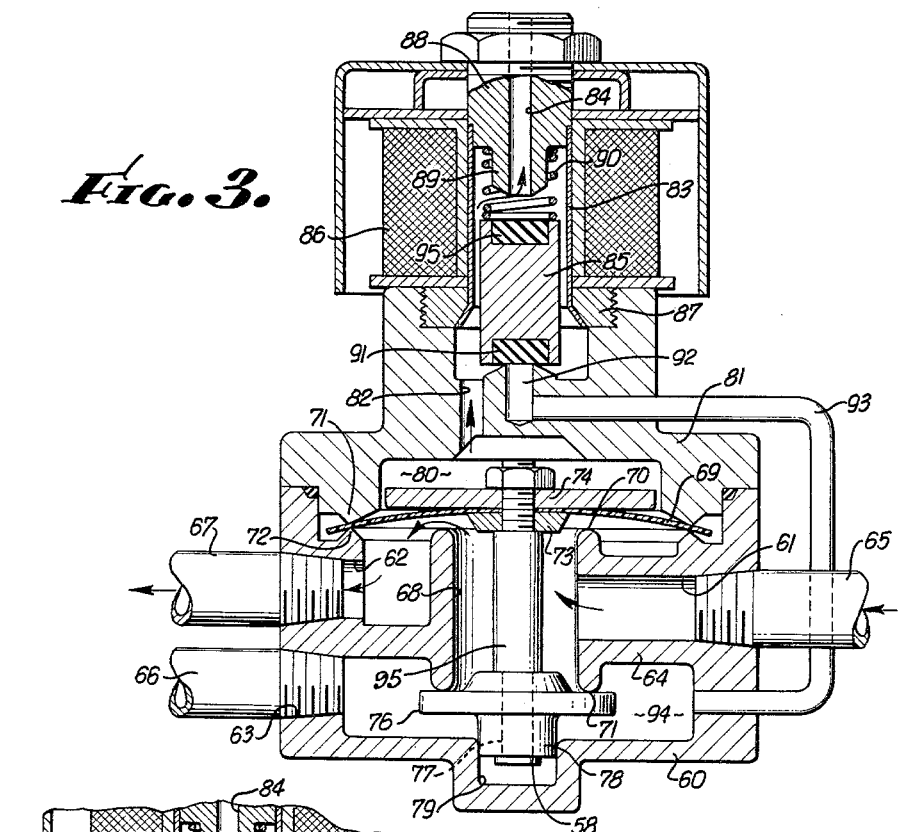
INVENTOR.
KEITH E. WILSON
BY
Flam and Flam
ATTORNEYS.

United States Patent Office 3,240,128
Patented Mar. 15, 1966

3,240,128
FLEXIBLE DIAPHRAGM OPERATED
VALVE STRUCTURE
Keith E. Wilson, Van Nuys, Calif., assignor to International Telephone and Telegraph Corporation, Baltimore, Md., a corporation of Maryland
Filed Dec. 18, 1961, Ser. No. 160,123
7 Claims. (Cl. 92—96)

This invention relates to a valve structure, and particularly to one in which the valve closure is carried by a flexible diaphragm.

Such valves, in a broad sense, are now well-known. In such instances, the diaphragm is tightly clamped at its edges, and accordingly, it must be so formed and so flexible as to permit ready movement of the diaphragm in the area within the confines of the unclamped portion. This flexibility is especially important at the annular band around the closure and often involves a substantial bending of the diaphragm in that region. Continued flexing and bending in this fashion results in deterioration of the diaphragm and consequent rupture thereof. Furthermore, vagaries in the mode of movement of the closure toward and away from its seat may retard full opening or closing of the valve.

It is one of the objects of this invention to improve in general such diaphragm valves.

It is another object of this invention to provide a valve structure in which harmful bending of the diaphragm is obviated.

In order to accomplish these results, the diaphragm is left unclamped at its edge, and the edge is urged into sealing relationship respectively with a pair of opposed annular surfaces when the diaphragm assumes an open or closed position. The opposed annular surfaces provide a guide for the relatively slight transverse movement of the diaphragm when the center area thereof is moved between open and closed positions.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a sectional view of a valve structure incorporating the invention, the valve being in closed position;

FIG. 2 is a view similar to FIG. 1 but illustrating the open position;

FIG. 3 is a view similar to FIG. 1 (somewhat diagrammatic) of another form of the invention, the valve being shown in one of its two alternative positions; and FIG. 4 is a view similar to FIG. 3 but illustrating the valve structure in its other alternative position.

In FIGS. 1 and 2, a valve body 1 is shown, having an inlet passage 2 and an outlet passage 3. These passages may each be provided with internal pipe threads for the accommodations of the pipes or conduits 4 and 5, leading respectively from a source of fluid under pressure, and to a place where the fluid is used.

The inlet passage 2 is separated from the outlet passage 3 by a wall 6, having a port 7. The upper edge 8 of this port serves as a seat for a closure structure to be hereinafter described. When the port 7 is open, fluid under pressure may flow between the two passages 2 and 3. When it is closed, as shown in FIG. 1, this flow of fluid is interrupted by a closure structure including a flexible diaphragm 9. This diaphragm 9 extends beyond the edges of the port 7. Its lower surface operates in this instance to seal against seat 8, and accordingly it may be made of appropriate flexible material, such as metal, glass fibre, rubber or plastic, or combinations of such materials. In the present instance, the diaphragm 9 is illustrated as being in the form of a disc and made from a single layer of sheet material.

A chamber 10 surrounds the wall of the port 7 and is in constant communication with the inlet port 2. The inlet pressure accordingly is effective underneath the diaphragm 9 to urge it upwardly to open position. Normally, however, the preponderance of pressure acting on the upper surface of the diaphragm is such as to maintain the valve in the closed position shown. This is effected in a manner to be later described.

The body 1 has an upper opening defined by a cylindrical recess 16. Forming a cover for the body 1, above the diaphragm 9 is a cap or bonnet 11. This cap or bonnet has a downwardly extending flange 12 fitting an upper end of the body recess 16. On the lower surface of the flange 12 there is formed an edge surface or apex 13 opposite a corresponding edge surface or apex 14 formed in the body member. These apices are formed by sloping side surfaces, similar to a knife-edge. The cap or bonnet 11 may be appropriately fastened to the body 1, and the body structure may be maintained fluid tight by the aid of the sealing member or gasket 15.

The surfaces or edges 13 and 14 are opposed respectively to the upper and lower surfaces of the diaphragm 9, but are not clamped thereagainst, there being freedom of movement of the diaphragm 9 to the open position of FIG. 2, as well as laterally, as permitted by the wall 16 formed in the interior of the body 1.

The body edges 13 and 14 extend circularly in spaced relationship about the seat 8. The operative edge of the seat 8 lies substantially at the plane defined by the body edges 13 and 14. Thus, in the closed position illustrated in FIG. 1, the diaphragm 9 is substantially flat. In the open position illustrated in FIG. 2, the diaphragm 9 flexes so as to project above the plane defined by the edges 13 and 14.

A disc 17 is attached to the upper surface of the diaphragm 9 by the aid of a rivet 18. This rivet 18 may be provided with washers 19 and 20. The rivet clamps the disc 17 only at the center part of the diaphragm 9 and permits the diaphragm to flex away from the disc 17, as shown, for example, in FIG. 2. In this position the edge of the diaphragm engages the surface 13. Disc 17 serves as a strengthening member to maintain the diaphragm 9 in flat condition when the valve is in the closed position of FIG. 1. In this position the edge of the diaphragm engages the surface 14. When the diaphragm 9 flexes upwardly from the closed position of FIG. 1 to the open position of FIG. 2, the marginal portions of the diaphragm 9 slide in a generally radial direction along the edges 13 and 14. The diaphragm, being free to slide, is not stretched; that is, its area remains the same whatever its degree of flexure. Thus the edges 13 and 14 do not confine the diaphragm against movement generally in the plane of the diaphragm. But the diaphragm at the very area of the edges 13 and 14 is prevented from moving axially with the center of the diaphragm. The sloping side surfaces of the apices or edges 13 and 14 ensure against the imposition of any strain upon the marginal portions of the diaphragm as these portions slide along the edges 13 and 14. Thus, as the diaphragm 9 flexes upwardly, the marginal portions thereof generally tilt about the edges 13 and 14. Portions of the diaphragm located just beyond the edges 13 and 14 tilt downwardly, and those just inwardly of the edges 13 and 14 tilt upwardly. The sloping portions inwardly joining the edge 13 and the sloping portions outwardly of the edge 14 ensure suitable clearance. The very edge of the diaphragm 9 clears the body recess 16.

The cap or bonnet 11 has a boss 21 which is internally threaded. The lower surface 22 of this cap or bonnet 11 defines a chamber 23 above the diaphragm 9. When this chamber is sealed, diaphragm 9 is urged downwardly by the ingress of fluid under pressure through an opening 24 in the diaphragm 9 to an annular recess 25 in disc 17. A passage 26 leads from this recess, and opens upwardly into the chamber 23.

While the pressure in chamber 23 is maintained, through ports 24 and 26, at the pressure at the inlet 2, the valve structure stays in the closed position of FIG. 1. The upper surface of diaphragm 9 presents a greater area than the annular lower surface subjected to inlet pressure. Accordingly, the force above the diaphragm overcomes the force below it.

In order to open the valve structure, the chamber 23 is relieved. For this purpose there is provided a port 27. This port may be placed in communication with the port 28 formed in the bonnet 11 and communicating with the port 29 formed in the body 1 and in communication with the outlet passage 3. A sealing bushing 30 may be placed between the contacting surfaces of the body 1 and the cap 11, and extending into both of the ports 28 and 29.

In the position of FIG. 1, the port 28 is closed by the yielding closure member 31. In the position of FIG. 2 this closure member 31 is lifted so as to permit the chamber 23 to exhaust through the ports 27, 28 and 29 into the outlet passage 3. The flow of fluid between inlet passage 2 and the outlet passage 3 is indicated by the arrows 32.

The closure 31 is mounted in a recess in a magnetic core or armature or plunger 33 that is guided by a sleeve 34. This sleeve has flared lower end, attached to a tapered recess of an externally threaded collar 35. This externally threaded collar engages the threads within the boss 21.

At its upper end the tube 34 is attached to a plug 36 of magnetic material which has an enlarged threaded extremity 37. The plug is attached as by welding to sleeve 34. The plunger 33 is operated by a coil 39 disposed on a frame 40 and around the sleeve 34.

The magnetic circuit is completed by the magnetic washers 43 and 44, as well as a magnetic shell 45. A cup 46 in inverted position is disposed between the washer 43 and the upper wall of shell 45. It has a central aperture through which the enlarged end 37 of the plug passes. The enlarged end also passes through the upper wall of the casing 45. A name plate 47 and a lock washer 48 are disposed above the frame or casing 45. A nut 49 serves to hold the assembly in place.

The leads 50 of coil 39 extend through a hollow projection 51 fastened as by welding to the frame 45. This hollow projection 51 may be internally threaded for the accommodation of an electrical coupling member 52.

A spring 53 is disposed in a recess 54, at the upper end of the plunger 33, in order to urge the plunger 33 normally downwardly to close the port 28.

When the electromagnet coil 38 is deenergized, as shown in FIG. 1, the spring 53 urges the plunger 33 downwardly to close the port 28, thereby sealing the chamber 23 against escape of fluid from this chamber.

When the electromagnet coil 39 is energized, as shown in FIG. 2, the closure 31 is lifted from the port 28 and the inlet pressure acting upon the lower side of the diapragm 9 is now sufficient to move the diaphragm 9 away from the seat 8 to open the valve. In this position there is a continual passage of fluid through the port into chamber 23 from the inlet side of the valve; but this is relatively minor, as most of the fluid entering the body 1 through the inward passage 2 passes via arrows 32 to the outlet passage 3.

In the closed position shown in FIG. 1, the diaphragm 9 is flat, and laterally movable within the confines of the wall 16. In the flexed position of FIG. 2, the diaphragm 9 can readily move between the opposed surfaces 13 and 14 to permit the flexure. There is no undue strain on the diaphragm is assuming the position of FIG. 2.

In the forms shown in FIGS. 3 and 4, the valve body 60 is provided with a port 61 in the right-hand wall and the pair of ports 62 and 63 on the left-hand wall. A ported wall 64 separates the port 63 from the other two ports 61 and 62.

The port 61 is provided with a conduit 65 which may lead to a pneumatic or hydraulic cylinder for actuating a piston.

The port 63 is provided with a conduit 66 leading to a source of fluid under pressure. Port 62 is provided with a conduit 67 leading to exhaust or relief.

In the position shown in FIG. 3, corresponding to the normal unenergized position of the actuating electromagnet, the port 61 is in communication with port 62 by way of the port 68 which is disposed in the wall 64. Accordingly, the cylinder which is intended to be actuated by fluid under pressure can exhaust through the conduit 67.

In the position of FIG. 4, the conduit 65 is supplied with fluid pressure from the conduit 66 via ports 63 and 68, as indicated by the arrows 59. The passage through exhaust conduit 67 is now closed by a diaphragm 69 which is in all respects similar to the diaphragm 9 described in connection with the form shown in FIGS. 1 and 2. This diaphragm is seated upon the valve seat 70 at the upper end of the port 68. As before, the diaphragm is slidable between the opposed surfaces 71 and 72.

In order to control the port 68, so that either the upper seat 70 or the lower seat 71 may be engaged by the closure structure, the diaphragm 69 carries a post 95 which passes through a washer 73 and through appropriate apertures in the diaphragm 69, and the disc 74. A nut 75 engages the threaded reduced end of the post 95.

The lower end of the post 95 is attached to a valve closure member 76 cooperating with the seat 71 formed around the lower end of port 68. This closure member 76 has an aperture therethrough for the passage of the reduced portion 77 of the post 95. The lower end 58 of the post is riveted over the end surface of closure member 76. The closure member 76 may be made of appropriate material to provide a satisfactory seal with respect to the seat 71.

The closure member 76 also has a cylindrical extension 78 forming a guide in the opening or recess 79 in the lower wall of the body.

In the position of FIG. 3, the chamber 80 formed by the cap or bonnet 81 above the diaphragm 69 is exhausted via port 82, guide sleeve 83 and port 84 formed in plug 88, to atmosphere. The plunger or core 85 operating within the sleeve 83 is in the deenergized position. Electromagnet coil 86 surrounds the sleeve 83 which has its lower end flared, as in the form shown in FIGS. 1 and 2 and attached to the collar 87. The stop or plug 88 is fastened to the upper end of the sleeve 83. In other respects, the electromagnet structure is similar to that shown in FIGS. 1 and 2.

The lower portion of the stop member 88 is provided with a reduced portion 89 serving as a guide for compression spring 90. The plunger 85 carries a closure member 91 which serves to close a port 92 formed in the cover 81. A conduit 93 connects this port 92 with the lower chamber 94 of the body 60. This lower chamber being in communication with the inlet conduit 66 exerts a pressure in chamber 80 to seat the diaphragm 69 upon the seat 70, while electromagnet 86 is energized (in FIG. 4). This cannot occur in the position shown in FIG. 3 because of the closing of the port 92 by closure 91, corresponding to the deenergized condition of electromagnet 86.

In the energized position of FIG. 4, the closure 95 carried by the upper end of the plunger 85 closes off the vent port 84. Accordingly, fluid under pressure from the inlet conduit 66 can flow through the conduit 93, port 92, and port 82 into chamber 80 for depressing the diaphragm to the position of FIG. 4.

Accordingly, by energizing and deenergizing the coil 86, the cylinder connected to the conduit 65 can be caused to be supplied with fluid under pressure or can be relieved of the pressure by way of the conduit 67.

The inventor claims:

1. In a diaphragm assembly for use in a valve structure: a flexible diaphragm having a peripheral portion; and a valve body having parts forming substantially opposed knife-like edges between which the peripheral portion of the diaphragm is received, said diaphragm having free peripheral edges projecting beyond said knife-like edges, said knife-like edges as the diaphragm is flexed, while con- amount relative to the thickness of the diaphragm to permit the peripheral portion of the diaphragm to slide inwardly and outwardly in a generally radial direction past said knife-like edges as the diaphragm is fixed, while confining the area of the diaphragm at said knife-like edges against axial movement with the center of the diaphragm; and a backing plate for one side of the diaphragm and attached thereto only at the center of the operative portion of the diaphragm to allow the diaphragm to flex substantially throughout its entire area upon movement of the diaphragm in said one direction.

2. In a diaphragm assembly for use in a valve structure: a flexible diaphragm having a peripheral portion; and a valve body having parts forming substantially opposed knife-like edges between which the peripheral portion of the diaphragm is received, said diaphragm having free peripheral edges projecting beyond said knife-like edges, said knife-like edges being spaced from each other an amount relative to the thickness of the diaphragm to permit the peripheral portion of the diaphragm to slide inwardly and outwardly in a generally radial direction past said knife-like edges as the diaphragm is flexed, while confining the area of the diaphragm at said knife-like edges against axial movement with the center of the diaphragm, said knife-like edges being formed to provide a restricted area of engagement with the diaphragm.

3. In a diaphragm assembly for use in a valve structure: a flexible diaphragm having a peripheral portion; and a valve body having parts forming substantially opposed knife-like edges between which the peripheral portion of the diaphragm is received, said diaphragm having free peripheral edges projecting beyond said knife-like edges said knife-like edges being spaced from each other an amount relative to the thickness of the diaphragm to permit the peripheral portion of the diaphragm to slide inwardly and outwardly in a generally radial direction past said knife-like edges as the diaphragm is flexed, while confining the area of the diaphragm at said knife-like edges against axial movement with the center of the diaphragm, said knife-like edges being formed to provide a restricted area of engagement with the diaphragm; one of said parts inwardly adjoining its said knife-like edge sloping in one axial direction away from the last-said knife-like edge, and the other of said parts outwardly adjoining its said knife-like edge sloping in the other axial direction away from the last-said knife-like edge whereby the peripheral portion of the diaphragm is free to tilt about said knife-like edges as the center of the diaphragm is moved axially.

4. In a diaphragm assembly for use in a valve structure: a flexible diaphragm having a peripheral portion; and a valve body having parts forming substantially opposed knife-like edges between which the peripheral portion of the diaphragm is received, said diaphragm having free peripheral edges projecting beyond said knife-like edges, said knife-like edges being spaced from each other an amount relative to the thickness of the diaphragm to permit the peripheral portion of the diaphragm to slide inwardly and outwardly in a generally radial direction past said knife-like edges as the diaphragm is flexed, while confining the area of the diaphragm at said knife-like edges against axial movement with the center of the diaphragm.

5. In a diaphragm assembly for use in a valve structure: a flexible diaphragm having a peripheral portion; a valve body having parts forming substantially opposed surfaces between which the peripheral portion of the diaphragm is received, said diaphragm having free peripheral edges projecting beyond said opposed surfaces, said opposed surfaces being spaced from each other an amount relative to the thickness of the diaphragm to permit the peripheral portion of the diaphragm to slide inwardly and outwardly in a generally radial direction past said surface portions as the diaphragm is flexed, while confining the area of the diaphragm at said opposed surfaces against axial movement with the center of the diaphragm; and a backing plate for one side of the diaphragm and attached therto only at the center of the operative portion of the diaphragm to allow the diaphragm to flex substantially throughout its entire area upon movement of the diaphragm in said one direction.

6. In a diaphragm assembly for use in a valve structure: a flexible diaphragm having a peripheral portion; a valve body having parts forming substantially opposed surfaces between which the peripheral portion of the diaphragm is received, said diaphragm having free peripheral edges projecting beyond said opposed surfaces, said opposed surfaces being spaced from each other an amount relative to the thickness of the diaphragm to permit the peripheral portion of the diaphragm to slide inwardly and outwardly in a generally radial direction past said surface portions as the diaphragm is flexed, while confining the area of the diaphragm at said opposed surfaces against axial movement with the center of the diaphragm, said opposed surfaces being formed to provide a restricted area of engagement with the diaphragm; one of said parts inwardly adjoining its said surface sloping in one axial direction away from the surface, and the other of said parts outwardly adjoining its said surface sloping in the other axial direction away from the surface whereby the peripheral portion of the diaphragm is free to tilt about said surfaces as the center of the diaphragm is moved axially in one direction; and a backing plate for one side of the diaphragm and attached thereto only at the center of the operative portion of the diaphragm to allow the diaphragm to flex substantially throughout its entire area to minimize the tilting of the diaphragm at its peripheral portion upon movement of the diaphragm in said one direction.

7. In a diaphragm assembly for use in a valve structure: a flexible diaphragm having a peripheral portion; a valve body having parts forming substantially opposed surfaces between which the peripheral portion of the diaphragm is received, said diaphragm having free peripheral edges projecting beyond said opposed surfaces, said opposed surfaces being spaced from each other an amount relative to the thickness of the diaphragm to permit the peripheral portion of the diaphragm to slide inwardly and outwardly in a generally radial direction past said surface portions as the diaphragm is flexed, while confining the area of the diaphragm at said opposed surfaces against axial movement with the center of the diaphragm; a backing plate for one side of the diaphragm and attached thereto only at the center of the operative portion of the diaphragm to allow the diaphragm to flex substantially throughout its entire area upon movement of the diaphragm in one direction; and means limiting movement of said diaphragm in the other direction and determining an orientation in which said diaphragm is located substantially in a plane defined by said opposed surfaces.

References Cited by the Examiner
UNITED STATES PATENTS

| | | | |
|---|---|---|---|
| 2,211,212 | 8/1940 | Langdon | 137—793 X |
| 2,688,342 | 9/1954 | Kehrer | 137—793 X |
| 2,738,157 | 3/1956 | Vargo | 251—45 X |
| 2,870,986 | 1/1959 | Vargo | 251—45 |
| 2,901,212 | 8/1959 | Winet | 251—333 |
| 2,907,347 | 10/1959 | Parks | 251—45 X |
| 2,980,032 | 4/1961 | Schneider | 137—793 X |
| 3,016,065 | 1/1962 | Stampfli | 137—623 |
| 3,055,630 | 9/1962 | Becker | 251—45 |
| 3,093,086 | 6/1963 | Altoz et al. | 103—150 |

FOREIGN PATENTS

| | | |
|---|---|---|
| 463,447 | 2/1950 | Canada. |
| 73,843 | 9/1960 | France. |
| 1,227,692 | 3/1960 | France. |
| 813,916 | 5/1959 | Great Britain. |
| 549,409 | 10/1956 | Italy. |

SAMUEL LEVINE, *Primary Examiner.*

KARL J. ALBRECHT, RICHARD B. WILKINSON,
*Examiners.*

UNITED STATES PATENT OFFICE
CERTIFICATE OF CORRECTION

Patent No. 3,240,128                      March 15, 1966

Keith E. Wilson

It is hereby certified that error appears in the above numbered patent requiring correction and that the said Letters Patent should read as corrected below.

Column 5, line 22, strike out "as the diaphragm is flexed, while con-" and insert instead -- being spaced from each other an --; line 26, for "fixed" read -- flexed --.

Signed and sealed this 24th day of January 1967.

(SEAL)
Attest:

ERNEST W. SWIDER
Attesting Officer

EDWARD J. BRENNER
Commissioner of Patents